US011041460B2

(12) United States Patent
Gormley et al.

(10) Patent No.: US 11,041,460 B2
(45) Date of Patent: Jun. 22, 2021

(54) SYNCHRONIZATION MECHANISM FOR PIVOT DOOR THRUST REVERSERS (71) Applicant: ROHR, INC., Chula Vista, CA (US)

(72) Inventors: Timothy Gormley, Bonita, CA (US); Stephane Dion, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 243 days.

(21) Appl. No.: 16/110,266

(22) Filed: Aug. 23, 2018

(65) Prior Publication Data

US 2019/0120172 A1    Apr. 25, 2019

Related U.S. Application Data (60) Provisional application No. 62/577,075, filed on Oct. 25, 2017.

(51) Int. Cl.
*F02K 1/76* (2006.01)
*F02K 1/60* (2006.01)
*F02K 1/70* (2006.01)

(52) U.S. Cl.
CPC .............. *F02K 1/763* (2013.01); *F02K 1/60* (2013.01); *F02K 1/70* (2013.01); *F05D 2260/57* (2013.01); *F05D 2270/66* (2013.01)

(58) Field of Classification Search
CPC . F02K 1/763; F02K 1/60; F02K 1/605; F02K 1/70; F02K 1/72; F02K 1/62; F02K 1/625
See application file for complete search history.

(56) References Cited

U.S. PATENT DOCUMENTS

| 2,943,433 | A | | 7/1960 | Voymas et al. | |
|---|---|---|---|---|---|
| 3,024,605 | A | | 3/1962 | Nash | |
| 3,164,956 | A | | 1/1965 | Colebrook et al. | |
| 3,266,734 | A | | 8/1966 | Gahagan et al. | |
| 3,532,275 | A | * | 10/1970 | Hom | F02K 1/60 239/265.33 |
| 4,790,495 | A | | 12/1988 | Greathouse et al. | |
| 4,966,327 | A | | 10/1990 | Fage et al. | |
| 5,267,438 | A | | 12/1993 | Bunel et al. | |
| 5,826,823 | A | | 10/1998 | Lymons et al. | |
| 6,684,623 | B2 | | 2/2004 | Langston et al. | |
| 6,688,099 | B2 | | 2/2004 | Lair | |
| 8,015,797 | B2 | | 9/2011 | Lair | |
| 8,793,973 | B2 | | 8/2014 | Vauchel | |
| 9,518,535 | B2 | | 12/2016 | Vauchel et al. | |
| 9,695,778 | B2 | | 7/2017 | Suciu et al. | |
| 9,759,158 | B2 | | 9/2017 | Marshall | |

(Continued)

OTHER PUBLICATIONS

International Search Report and Written Opinion dated Jul. 30, 2019 in PCT Application No. PCT/US2018/056344.

*Primary Examiner* — Andrew H Nguyen
(74) *Attorney, Agent, or Firm* — Snell & Wilmer L.L.P.

(57) ABSTRACT

A thrust reverser includes a frame having a longitudinal axis, a first reverser door pivotally mounted to the frame, a second reverser door pivotally mounted to the first reverser door, a crank pivotally mounted to the frame, a first link connecting the crank to the first reverser door, and a second link connecting the crank to the second reverser door. In various embodiments, both the first reverser door and the second reverser door are driven by a single actuator.

16 Claims, 6 Drawing Sheets

(56) References Cited

U.S. PATENT DOCUMENTS

2003/0218094 A1* 11/2003 Lair ..................... F02K 1/766
                                                    244/110 B
2004/0195443 A1* 10/2004 Lair ..................... F02K 1/70
                                                    244/110 B

* cited by examiner

SYNCHRONIZATION MECHANISM FOR PIVOT DOOR THRUST REVERSERS

CROSS-REFERENCE TO RELATED APPLICATIONS

This application claims priority to, and the benefit of, U.S. Prov. Pat. Appl., Ser. No. 62/577,075, entitled "Synchronization Mechanism Allowing Single Actuator—SMASA," filed on Oct. 25, 2017, the entirety of which is incorporated herein for all purposes by this reference.

FIELD

The present disclosure relates generally to aircraft thrust reversers used with gas turbine engines and, more particularly, to synchronization mechanisms used with pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include thrust reversers capable of redirecting the bypass airflow from the rearward direction to, at least partially, a forward direction thus producing a rearward thrust that may serve to decelerate the forward motion of an aircraft and thereby assist braking the aircraft upon landing. Pivot door thrust reversers may be used with turbofan gas turbine engines for aircraft, including for corporate or business jets.

SUMMARY

A thrust reverser is disclosed. In various embodiments, the thrust reverser includes a frame having a longitudinal axis, a first reverser door pivotally mounted to the frame, a second reverser door pivotally mounted to the first reverser door, a crank pivotally mounted to the frame, a first link connecting the crank to the first reverser door and a second link connecting the crank to the second reverser door. In various embodiments, the frame includes a first end and a second end spaced longitudinally from the first end and the first reverser door is pivotally mounted to the frame proximate the second end. In various embodiments, the frame includes a central portion intermediate the first end and the second end and the crank is pivotally mounted to the frame at a crank pivot point proximate the central portion. In various embodiments, the crank includes an inner radial portion with respect to the crank pivot point and an outer radial portion with respect to the crank pivot point and the first link has a first end pivotally connected to the inner radial portion. The second link may also have a first end pivotally connected to the outer radial portion.

In various embodiments, the first reverser door includes an aft end and a first offset panel positioned proximate the aft end and the first offset panel is pivotally mounted to the frame at a first panel pivot point. In various embodiments, the second reverser door includes an aft end and a second offset panel positioned proximate the aft end and the second offset panel is pivotally mounted to the first reverser door at a second panel pivot point. In various embodiments, the crank is pivotally mounted to the frame at the crank pivot point positioned along the longitudinal axis and the first panel pivot point is positioned on a first side of the longitudinal axis. In various embodiments, the second panel pivot point is positioned on a second side of the longitudinal axis opposite the first side.

In various embodiments, the frame comprises a side beam of a thrust reverser having a fore end and an aft end, the longitudinal axis runs longitudinally from the fore end of the side beam to the aft end of the side beam, and the first reverser door is a lower reverser door with respect to the side beam. In various embodiments, the second reverser door is an upper reverser door with respect to the side beam, the first panel pivot point is spaced a first distance above the longitudinal axis and the second panel pivot point is spaced a second distance below the longitudinal axis. In various embodiments, the frame includes a second side beam spaced a lateral distance from the first side beam, and the thrust reverser further comprises a second crank pivotally mounted to the second side beam, a third link connecting the second crank to the first reverser door and a fourth link connecting the second crank to the second reverser door.

In various embodiments, the thrust reverser includes an actuator that has a first end connected to the frame and a second end connected to the first reverser door. In various embodiments, the frame further includes a bulkhead and the actuator is a linear actuator having a first end connected to the bulkhead and a second end connected to the first reverser door.

A pivot door thrust reverser is disclosed. The thrust reverser includes a frame having a central axis, a first side beam and a second side beam, the second side beam being positioned on an opposite side of the central axis from the first side beam, a first reverser door pivotally mounted to the first side beam and to the second side beam, a second reverser door pivotally mounted to the first reverser door, a first crank pivotally mounted to the first side beam at a first crank pivot point, a first link connecting the first crank to the first reverser door and a second link connecting the first crank to the second reverser door.

In various embodiments, the first side beam includes an aft end, the second side beam includes an aft end and the first reverser door is pivotally mounted to the frame proximate the aft end of the first side beam and proximate the aft end of the second side beam. In various embodiments, the first reverser door includes a first side and a second side, the second reverser door includes a first side and a second side and the first side of the second reverser door is pivotally mounted to the first side of the first reverser door and the second side of the second reverser door is pivotally mounted to the second side of the first reverser door.

In various embodiments, the first crank includes an inner radial portion with respect to the first crank pivot point and an outer radial portion with respect to the first crank pivot point and the first link has a first end pivotally connected to the inner radial portion and the second link has a first end pivotally connected to the outer radial portion. In various embodiments, the thrust reverser further includes a second crank pivotally mounted to the second side beam at a second crank pivot point, a third link connecting the second crank to the first reverser door and a fourth link connecting the second crank to the second reverser door. In various embodiments, the second crank includes an inner radial portion with respect to the second crank pivot point and an outer radial portion with respect to the second crank pivot point and the third link has a first end pivotally connected to the inner radial portion and the fourth link has a first end pivotally connected to the outer radial portion. In various embodiments, the first link has a second end pivotally connected to the first side of the first reverser door and the second link has a second end pivotally connected to the first side of the second reverser door. In various embodiments, the third link has a second end pivotally connected to the second side of the first reverser door and the fourth link has a second end pivotally connected to the second side of the second reverser door.

A pivot door thrust reverser is disclosed. In various embodiments, the thrust reverser includes a frame having a central axis, a forward bulkhead, a first side beam extending aft of the forward bulkhead and a second side beam extending aft of the forward bulkhead, the second side beam being positioned on an opposite side of the central axis from the first side beam, a lower reverser door pivotally mounted to the first side beam and to the second side beam, an upper reverser door pivotally mounted to the lower reverser door, a first crank pivotally mounted to the first side beam, a second crank pivotally mounted to the second side beam, a first link connecting the first crank to the lower reverser door, a second link connecting the first crank to the upper reverser door, a third link connecting the second crank to the lower reverser door, a fourth link connecting the second crank to the upper reverser door and an actuator having a first end connected to the frame and a second end connected to the lower reverser door.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to a direction outward or, generally, away from a reference component. As used herein, "proximal" or "proximate" refer to a direction inward or, generally, towards a reference component.

Figure 1:
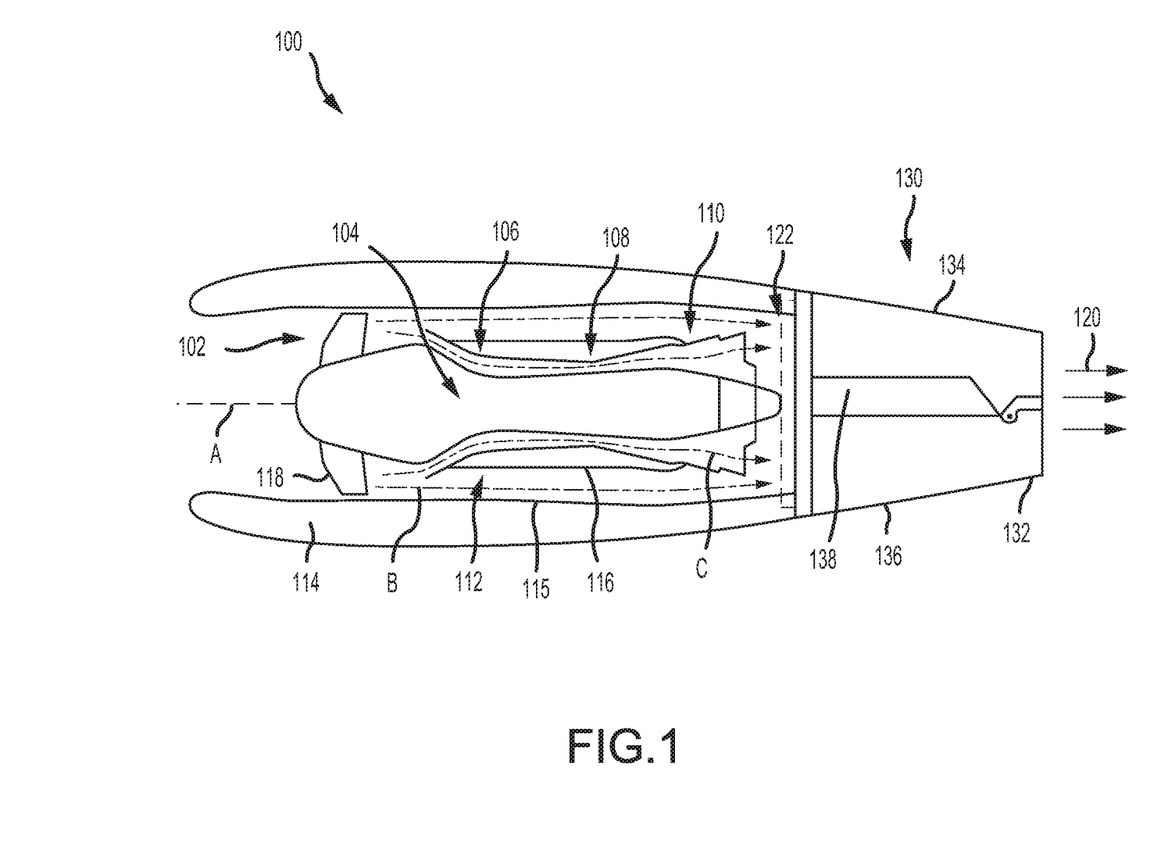
FIG. 1 is a schematic view of a gas turbine engine, in accordance with various embodiments.

Referring now to the drawings, FIG. 1 schematically illustrates a gas turbine engine 100 of the turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed, stowed or retracted position, as illustrated in FIG. 1. The thrust reverser 130 further includes an upper reverser door 134, a lower reverser door 136 and a pair of opposing side beams 138, which may house actuator componentry and connecting members used to open and close the upper reverser door 134 and lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 provides the reverse thrust used to decelerate an aircraft upon landing.

Figure 2:
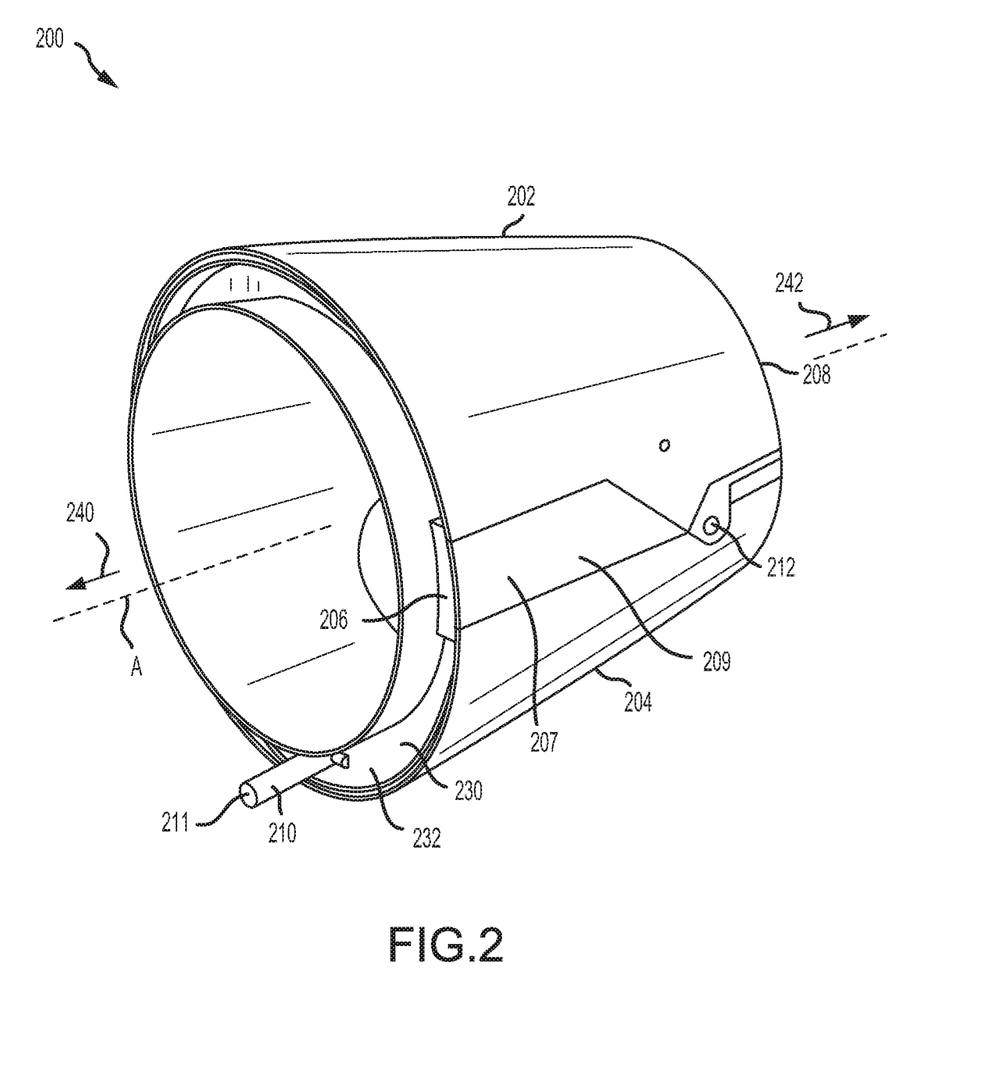
FIG. 2 is a schematic view of a stowed thrust reverser for a gas turbine engine, according to various embodiments.

Referring now to FIG. 2, a side view of a thrust reverser 200 according to various embodiments is illustrated in the closed, stowed or retracted position. The thrust reverser 200 includes an upper reverser door 202, a lower reverser door 204, a pair of opposing side beams 206 (only one is shown) and an exhaust duct 208. In various embodiments, a cover 207 may be incorporated into the opposing side beams 206 to affect an aerodynamic surface about an exterior of the thrust reverser 200. As described in more detail below, the pair of opposing side beams 206 provide, or are components of, a frame 230 that may also include a bulkhead 232. The frame 230 provides structural support for mounting components associated with operating the thrust reverser 200 between stowed and deployed states or positions. In various embodiments, for example, an actuator 210 may have a first end 211 connected to the bulkhead 232 and a second end (hidden) connected to an inner surface of the lower reverser door 204. As described in further detail below, the thrust reverser includes a pivot 212 that connects the upper reverser door 202 to the lower reverser door 204.

Still referring to FIG. 2, a central axis A is illustrated extending through the thrust reverser 200. The central axis A may define a fore end or fore direction 240 of the thrust reverser 200 and an aft end or aft direction 242 of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, a port side beam 209 may be considered positioned to the port or left side of the central axis A (looking in the fore direction 240) while a starboard side beam (hidden) may be considered positioned to the right or starboard side of the central axis A. More generally, however, reference to a first reverser door may generally refer to a reverser door positioned opposite a second reverser door with respect to the central axis A, there being no preferred up or down or side to side orientation, while reference to a first side beam may generally refer to a side beam positioned opposite a second side beam with respect to the central axis A. As used herein, a first object being positioned opposite a second does not imply one object is a mirror image of the other or is positioned symmetrically to the other, though such configurations or positioning are not excluded either.

Figure 3A:
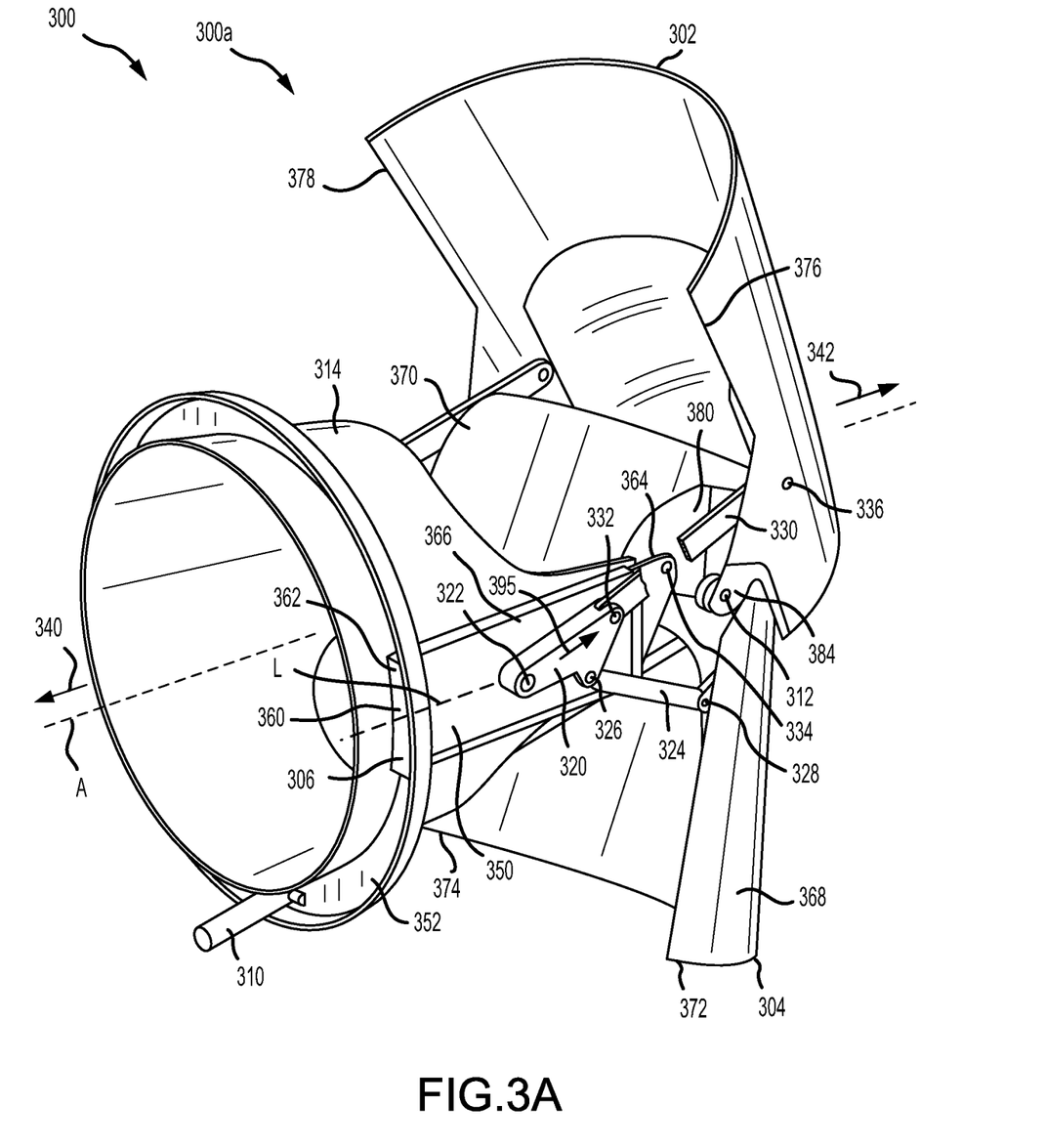
FIGS. 3A and 3B are a schematic views of a deployed thrust reverser for a gas turbine engine, according to various embodiments.
Figure 3B:
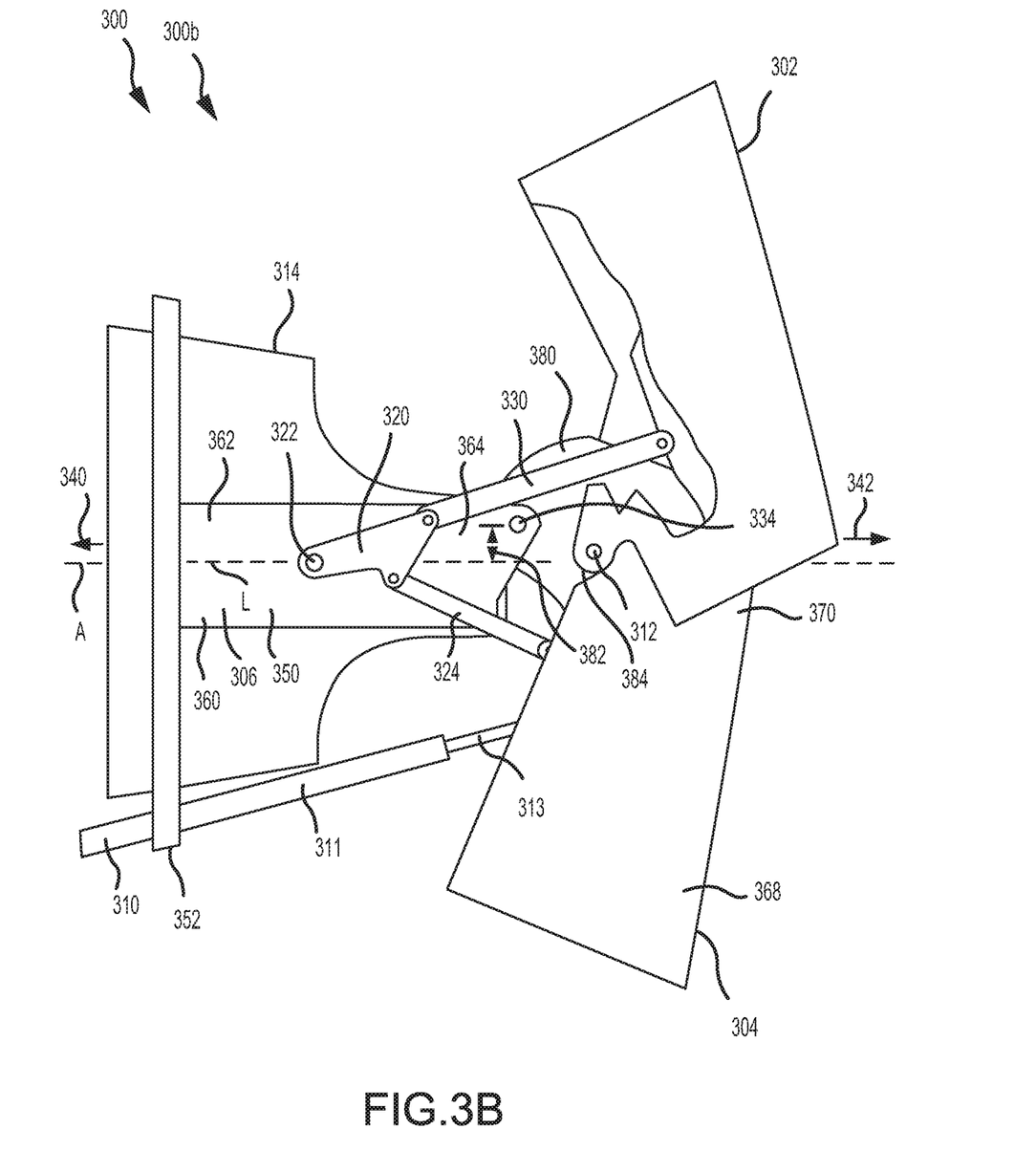

Referring now to FIGS. 3A and 3B, a schematic perspective view 300a of a thrust reverser 300 and a schematic side view 300b of a thrust reverser 300 are shown, according to various embodiments, in the open or deployed state or position. Similar to the foregoing description with reference to FIG. 2, the thrust reverser 300 includes a second or upper reverser door 302, a first or lower reverser door 304 and a pair of opposing side beams 306 (only one is shown). The thrust reverser 300 includes a frame 350 which, without loss of generality, may itself comprise, singularly or together, one or both of the pair of opposing side beams 306, a nozzle portion 314 and a bulkhead 352. A central axis A may extend through the thrust reverser 300 while, in various embodiments, a longitudinal axis L may extend through one of the pair of opposing side beams 306. Both the central axis A and the longitudinal axis L may be considered to extend fore and aft with respect to a fore direction 340 and an aft direction 342.

Still referring to FIGS. 3A and 3B, the thrust reverser 300 includes a first side beam 360. The first side beam 360 includes a longitudinal axis L extending generally in fore and aft directions and has a first or fore end 362, a second or aft end 364 and a central portion 366 intermediate the two ends. The first or lower reverser door 304 includes a fore end 368 and an aft end 370. The first or lower reverser door 304 is generally arcuate in cross section and includes a first side 372 and a second side 374 that generally run fore and aft along the length of the reverser door. The second or upper reverser door 302 has similar characteristics, including fore and aft ends and a first side 376 and a second side 378. The first or lower reverser door 304 is pivotally mounted to the first side beam 360 at a first pivot point 334. In various embodiments, the first pivot point 334 may comprise a pin or a spherical bearing. The first or lower reverser door 304 includes an offset panel 380 that extends from the first side 372 of the first or lower reverser door 304 a distance sufficient to pivotally connect with the first side beam 360 at the first pivot point 334. Referring briefly to FIG. 3B, the first pivot point 334 is spaced a first offset distance 382 from the longitudinal axis L. In various embodiments, the first offset distance 382 can be positive (e.g., above the longitudinal axis L) or negative (e.g., below the longitudinal axis L). The first or lower reverser door 304 may further include an offset panel on the second side 374 of the first or lower reverser door 304 that is pivotally connected to a second side beam (hidden) in a manner similar to that just described. In various embodiments, a first hinge-line 390 extends through the first pivot point 334 on the first side 372 of the first or lower reverser door 304 and the pivotal connection on the second side 374 of the first or lower reverser door 304. In various embodiments, the first hinge-line will extend in a direction perpendicular to the central axis A. In various embodiments, the pivotal connection on the second side 374 of the first or lower reverser door 304 is laterally opposite the first pivot point 334.

While the first or lower reverser door 304, as above described, is pivotally mounted to the first and second side beams, the second or upper reverser door 302, as described below, is pivotally mounted to the first or lower reverser door 304. The second or upper reverser door 302 includes an offset panel 384 that extends from the first side 376 of the second or upper reverser door 302 a distance sufficient to pivotally connect with the first or lower reverser door 304 at a second pivot point 312. In various embodiments, the second pivot point 312 may comprise a pin or a spherical bearing. The second pivot point 312 extends through both the offset panel 384 of the second or upper reverser door 302 and the offset panel 380 of the first or lower reverser door 304. The second or upper reverser door 302 may further include an offset panel on the second side 378 of the second or upper reverser door 302 that is pivotally connected to an offset panel on the second side 374 of the first or lower reverser door 304 in a manner similar to that just described. In various embodiments, a second hinge-line 392 extends through the second pivot point 312 on the first side 376 of the second or upper reverser door 302 and the pivotal connection on the second side 378 of the second or upper reverser door 302. In various embodiments, the second hinge-line will extend in a direction perpendicular to the central axis A. In various embodiments, the pivotal connection on the second side 378 of the second or upper reverser door 302 is laterally opposite the second pivot point 312. In various embodiments, the second hinge-line 392 may be fore or aft of the first hinge-line 390. In various embodiments, the first hinge-line 390 may be parallel to the second hinge-line 392. In various embodiments, the first hinge-line 390 may be non-parallel to the second hinge-line 392. In various embodiments, the first hinge-line 390 may be above the second hinge-line 392 (e.g., with respect to a vertical plane) and in various embodiments the first hinge-line 390 may be below the second hinge-line 392 (e.g., with respect to a vertical plane).

The above disclosure describes a thrust reverser 300 having a first or lower reverser door 304 that is pivotally mounted to first and second side beams and a second or upper reverser door 302 that is pivotally mounted to the first or lower reverser door 304. In various embodiments, the structure of the various components of the pivot mechanisms described above with respect to the first side 372 of the first or lower reverser door 304 and the first side 376 of the second or upper reverser door 302 is symmetrically identical to the structure of the various components of the pivot mechanisms described with respect to the second side 374 of the first or lower reverser door 304 and the second side 378 of the second or upper reverser door 302. The following disclosure describes a linkage mechanism that enables the second or upper reverser door 302 to open and close in synchronization with the first or lower reverser door 304, according to various embodiments.

Referring still to FIGS. 3A and 3B, a first crank 320 is pivotally disposed on the first side beam 360 at a crank pivot point 322 proximate the central portion 366 of the first side beam 360. A first link 324 connects the first crank 320 to the first side 372 of the first or lower reverser door 304. A second link 330 connects the first crank 320 to the first side 376 of the second or upper reverser door 302. In various embodiments, the first crank 320 may be characterized by a radial dimension 395 (with respect to the crank pivot point 322) as having an outer radial portion and an inner radial portion, with the outer radial portion having a radial dimension greater than the inner radial portion. In various embodiments, the first link 324 has a first end pivotally connected to the inner radial portion of the first crank 320 at a first pivot point 326 and a second end connected to the first side 372 of the first or lower reverser door 304 at a second pivot point 328. In various embodiments, the second link 330 has a first end pivotally connected to the outer radial portion of the first crank 320 at a first pivot point 332 and a second end connected to the first side 376 of the second or upper reverser door 302 at a second pivot point 336.

In various embodiments, the thrust reverser 300 may include a second crank (hidden) pivotally mounted to a second side beam positioned opposite the first side beam 360. Similar to the above description, in various embodiments, a third link (opposite the first link 324) may have a first end pivotally connected to an inner radial portion (with respect to a crank pivot point for the second crank) of the second crank at a first pivot point and a second end connected to the second side 374 of the first or lower reverser door 304 at a second pivot point. Similarly, a fourth link (opposite the second link 330) may have a first end pivotally connected to an outer radial portion (with respect to the crank pivot point for the second crank) of the second crank at a first pivot point and a second end connected to the second side 378 of the second or upper reverser door 302 at a second pivot point. In various embodiments, the second crank and associated linkage is opposite to and symmetric with the first crank 320 and its associated linkage, including the first link 324 and the second link 330 and the various connecting pivot points, as described above.

The thrust reverser 300 may further include an actuator configured to open and close the first or lower reverser door 304. In various embodiments, a linear actuator 310 is employed to open and close the first or lower reverser door 304. The linear actuator 310 may include a first end 311 pivotally connected to the bulkhead 352 and a second end 313 pivotally connected to the first or lower reverser door 304. In various embodiments, the linear actuator 310 is centrally positioned between the first side beam 360 and the second side beam and the second end 313 of the linear actuator 310 is connected to a center portion of the inner surface of the first or lower reverser door 304. In various embodiments, the actuator, e.g., the linear actuator 310, is positioned off-center, such as adjacent the first side beam 360 or the second side beam. In various embodiments, multiple actuators may be used to affect opening and closing of the first and second reverser doors.

Figure 4A:
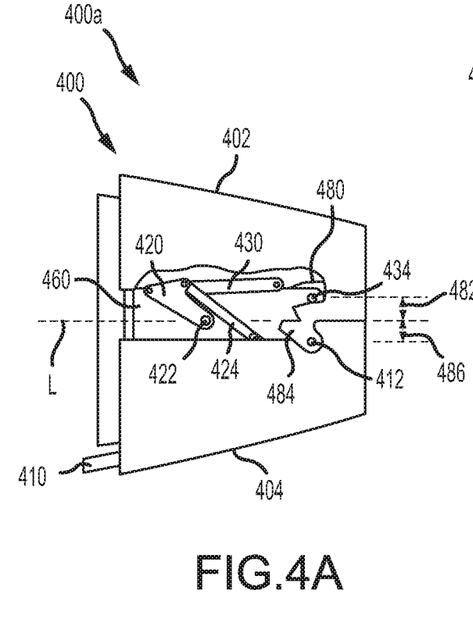
FIGS. 4A, 4B, 4C and 4D are schematic views of a thrust reverser, according to various embodiments, illustrating a progression of steps between stowed and deployed states.
Figure 4B:
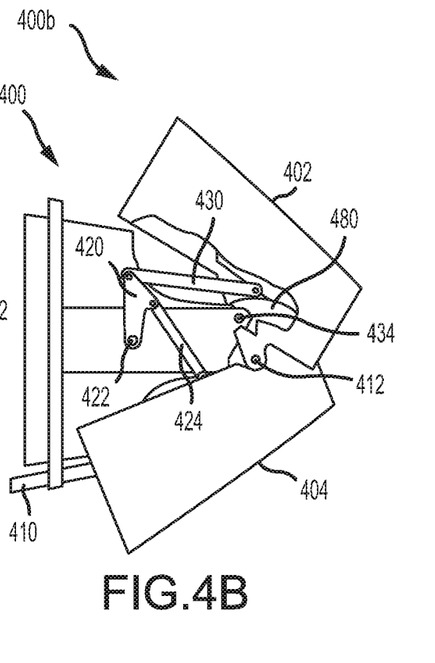
Figure 4C:
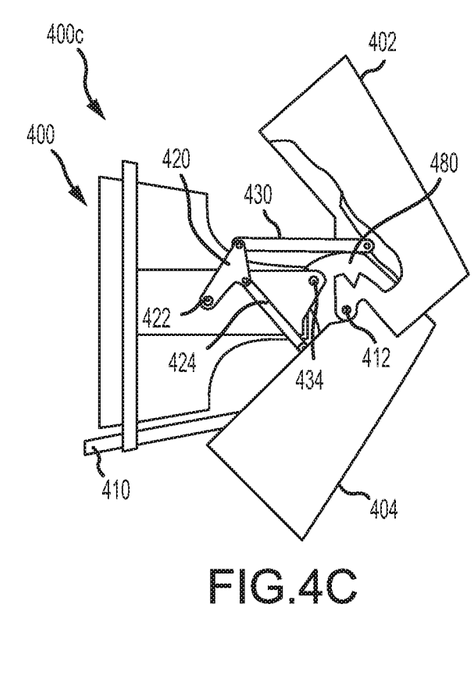
Figure 4D:
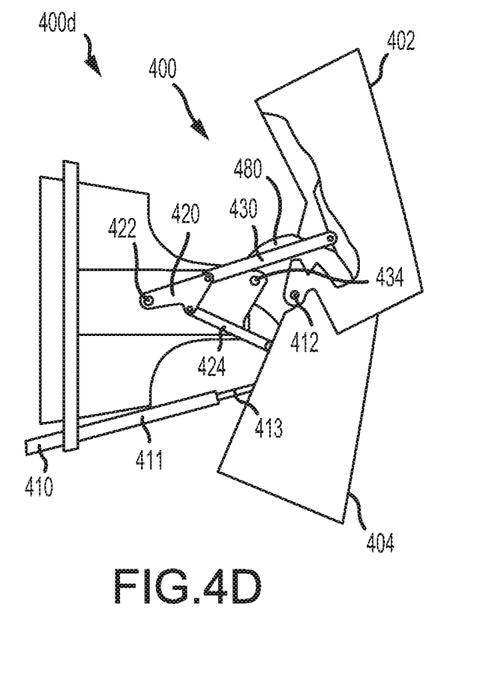

Referring now to FIGS. 4A, 4B, 4C and 4D, operation of a thrust reverser 400 is illustrated and described in accordance with various embodiments. Referring to FIG. 4A, a thrust reverser 400 is illustrated in a closed or stowed state 400a. Similar to the above description, the thrust reverser 400 includes a first or lower reverser door 404, a second or upper reverser door 402 and a frame, including a first side beam 460. The first or lower reverser door 404 includes an offset panel 480 that is pivotally mounted to the first side beam 460 at a first pivot point 434 and the second or upper reverser door 402 includes an offset panel 484 that is pivotally mounted to the first or lower reverser door 404 at a second pivot point 412. A longitudinal axis L runs in fore and aft directions along the first side beam 460. A first crank 420 is pivotally mounted to the first side beam 460 at a crank pivot point 422 positioned along the longitudinal axis L. While described as being pivotally mounted along the longitudinal axis L, in various embodiments, the first crank 420 may be mounted in other locations, either along the first side beam 460 or, more generally, the frame. A first link 424 connects the first crank 420 to the first or lower reverser door 404 and a second link 430 connects the first crank 420 to the second or upper reverser door 402.

In various embodiments, the first pivot point 434, where the first or lower reverser door 404 is pivotally connected to the first side beam 460, is positioned on an upper or first side of the longitudinal axis L and spaced a first distance 482 from the longitudinal axis L. In various embodiments, the second pivot point 412, where the second or upper reverser door 402 is pivotally connected to the first or lower reverser door 404, is positioned on a lower or second side of the longitudinal axis L and spaced a second distance 486 from the longitudinal axis L. In various embodiments, one or both of the first distance 482 and the second distance 486 are greater than zero. In various embodiments, one or both of the first distance 482 and the second distance 486 may be greater than or less than zero, meaning the corresponding hinge-lines may be on the same side of the longitudinal axis L or on opposite sides of the longitudinal axis L.

As described above, in various embodiments, the thrust reverser 400 may include a second crank (hidden) pivotally mounted to a second side beam positioned opposite the first side beam 460. A third link (opposite the first link 424) may have a first end pivotally connected to an inner radial portion of the second crank and a second end connected to the first or lower reverser door 404 and a fourth link (opposite the second link 430) may have a first end pivotally connected to the second crank and a second end connected to the second or upper reverser door 402. In various embodiments, the second crank and associated linkage is opposite to and symmetric with the first crank 420 and its associated linkage, including the first link 424 and the second link 430 and the various connecting pivot points, as described above.

Referring still to FIGS. 4A, 4B, 4C and 4D, various kinematic positions of the thrust reverser are illustrated as the thrust reverser opens from a closed or stowed state 400a, to a first partially deployed state 400b, to a second partially deployed state 400c and, finally, to a fully deployed state 400d. Starting from the stowed state 400a, an actuator 410 urges the first or lower reverser door 404 to pivot in an anti-clockwise manner about the first pivot point 434. As the first or lower reverser door 404 pivots, the second end of the first link 424 follows the first or lower reverser door 404, thereby urging the first crank 420 to pivot about the first side beam 460. As the first crank 420 pivots, the second end of the second link 430 urges the second or upper reverser door 402 to pivot with respect to the first or lower reverser door 404 at the second pivot point 412. The process continues through each of the stages illustrated in FIGS. 4A-D. To stow the reverser doors from a deployed state or position, the process is reversed.

The disclosure provides a synchronized linkage for opening and stowing first and second reverser doors. The first link 424 and the second link 430 couple the first crank 420 to the first or lower reverser door 404 and the second or upper reverser door 402, the second pivot point 412 couples the second or upper reverser door 402 to the first or lower reverser door 404 and the first pivot point 434 couples both reverser doors to the first side beam 460. While the disclosure provides an actuator 410 having a first end 411 connected to a bulkhead and a second end connected to the first or lower reverser door 404, it should be apparent that the actuator may be configured otherwise, such as to open and close the second or upper reverser door 402 or, alternatively, to rotate the first crank 420.

Figure 5A:
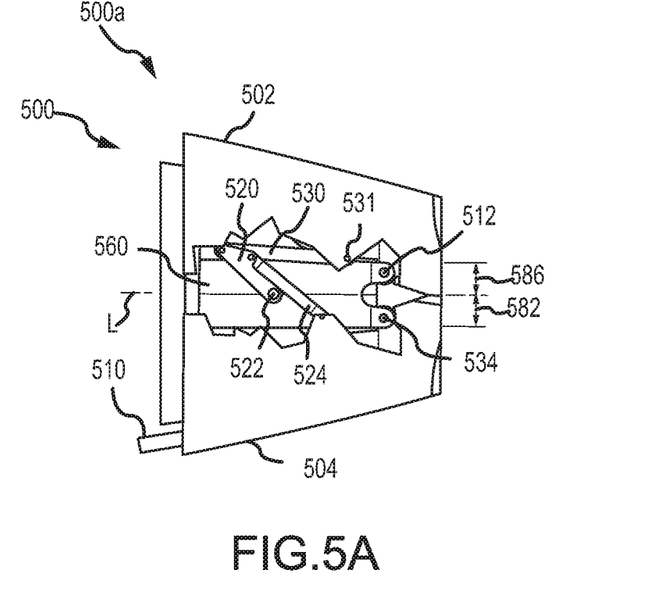
FIGS. 5A and 5B are schematic views of a thrust reverser, according to various embodiments, illustrating the thrust reverser in the stowed and deployed states.
Figure 5B:
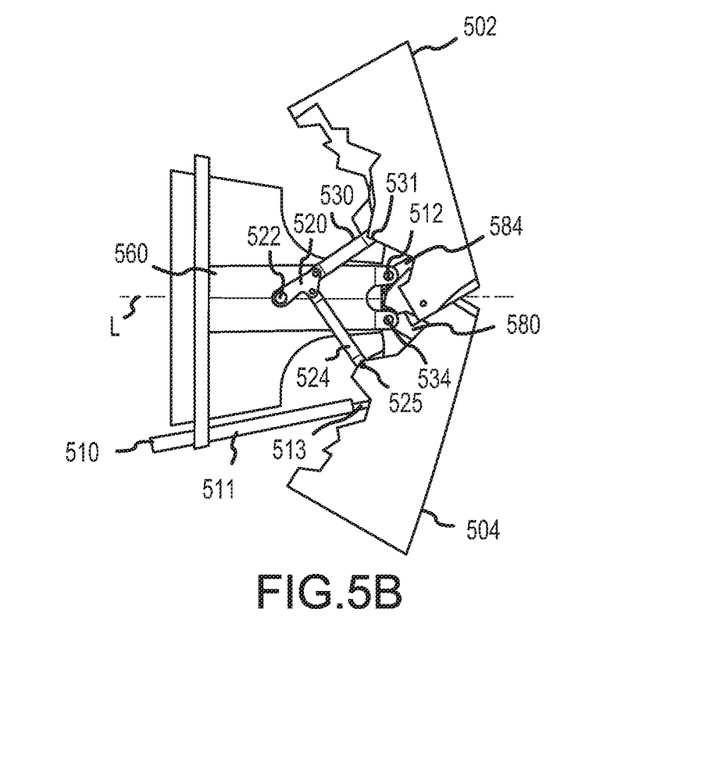

Referring now to FIGS. 5A and 5B, a thrust reverser 500 is illustrated and described, in accordance with various embodiments, in a closed or stowed state 500a and in an open or deployed state 500b. Similar to the above description, the thrust reverser 500 includes a first reverser door 504, a second reverser door 502 and a frame, including a first side beam 560. The first reverser door 504 includes a tab or offset panel 580 that is pivotally mounted to the first side beam 560 at a first pivot point 534 and the second reverser door 502 includes a tab or offset panel 584 that is pivotally mounted to the first side beam 560 at a second pivot point 512. A longitudinal axis L runs in fore and aft directions along the first side beam 560. A first crank 520 is pivotally mounted to the first side beam 560 at a first crank pivot point 522 positioned along the longitudinal axis L. While described as being pivotally mounted along the longitudinal axis L, in various embodiments, the first crank 520 may be mounted in other locations, either along the first side beam 560, above or below the longitudinal axis L, or, more generally, anywhere on the frame. A first link 524 connects the first crank 520 to the first reverser door 504 at a first door-link pivot point 525 and a second link 530 connects the first crank 520 to the second reverser door 502 at a second door-link pivot point 531.

In various embodiments, the first pivot point 534, where the first reverser door 504 is pivotally connected to the first side beam 560, is positioned on a first side of the longitudinal axis L and spaced a first distance 582 from the longitudinal axis L. In various embodiments, the second pivot point 512, where the second reverser door 502 is pivotally connected to the first side beam 560, is positioned on a second side of the longitudinal axis L and spaced a second distance 586 from the longitudinal axis L. In various embodiments, one or both of the first distance 582 and the second distance 586 are greater than zero. In various embodiments, one or both of the first distance 582 and the second distance 586 may be greater than or less than zero, meaning the corresponding hinge-lines may be on the same side of the longitudinal axis L or on opposite sides of the longitudinal axis L.

As described above, in various embodiments, the thrust reverser 500 may include a second crank (hidden) pivotally mounted to a second side beam positioned opposite the first side beam 560. A third link (opposite the first link 524) may have a first end pivotally connected to the second crank and a second end connected to the first reverser door 504 and a fourth link (opposite the second link 530) may have a first end pivotally connected to the second crank and a second end connected to the second reverser door 502. In various embodiments, the second crank and associated linkage is opposite to and symmetric with the first crank 520 and its associated linkage, including the first link 524 and the second link 530 and the various connecting pivot points, as described above.

The disclosure provides a synchronized linkage for opening and stowing first and second reverser doors hinged to a frame or one or more side beams of a frame. The first link 524 and the second link 530 couple the first crank 520 to the first reverser door 504 and the second reverser door 502, the second pivot point 512 couples the second reverser door 502 to the first side beam 560 and the first pivot point 534 couples the first reverser door 504 to the first side beam 560. While the disclosure provides an actuator 510 having a first end 511 connected to a bulkhead and a second end 513 connected to the first reverser door 504, it should be apparent the actuator may be configured otherwise, such as to open and close the second reverser door 502 or, alternatively, to rotate the first crank 520.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A thrust reverser, comprising:
a frame having a longitudinal axis;
a first reverser door pivotally mounted to the frame;
a second reverser door directly and pivotally mounted to the first reverser door;
a first crank pivotally mounted to the frame, the first crank having an outer radial portion and an inner radial portion with respect to a radial dimension extending from a crank pivot point;
a first link directly connecting the inner radial portion of the first crank to the first reverser door; and
a second link directly connecting the outer radial portion of the first crank to the second reverser door.

2. The thrust reverser of claim 1, wherein the frame includes a first end, a second end spaced longitudinally from the first end and a central portion intermediate the first end and the second end and wherein the first crank is pivotally mounted to the frame at the crank pivot point proximate the central portion.

3. The thrust reverser of claim 2, wherein the first reverser door is pivotally mounted to the frame proximate the second end of the frame.

4. The thrust reverser of claim 3, wherein the first reverser door includes a first reverser door aft end and a first offset panel positioned proximate the first reverser door aft end and wherein the first offset panel is pivotally mounted to the frame at a first offset panel pivot point.

5. The thrust reverser of claim 4, wherein the second reverser door includes a second reverser door aft end and a second offset panel positioned proximate the second reverser door aft end and wherein the second offset panel is pivotally mounted to the first reverser door at a second offset panel pivot point.

6. The thrust reverser of claim 5, wherein the first crank is pivotally mounted to the frame at the crank pivot point, the crank pivot point extending perpendicularly through the longitudinal axis, and wherein the first offset panel pivot point is positioned on a first side of the longitudinal axis.

7. The thrust reverser of claim 6, wherein the second offset panel pivot point is positioned on a second side of the longitudinal axis opposite the first side when the first reverser door is in a stowed position.

8. The thrust reverser of claim 7, wherein the frame comprises a first side beam having a first side beam fore end and a first side beam aft end, wherein the longitudinal axis extends longitudinally from the first side beam fore end to the first side beam aft end, wherein the first reverser door is a lower reverser door with respect to the first side beam, wherein the second reverser door is an upper reverser door with respect to the first side beam, wherein the first offset panel pivot point is spaced a first distance above the longitudinal axis and wherein the second offset panel pivot point is spaced a second distance below the longitudinal axis.

9. The thrust reverser of claim 8, wherein the frame includes a second side beam spaced a lateral distance from the first side beam, and wherein the thrust reverser further comprises a second crank pivotally mounted to the second side beam, a third link connecting the second crank to the first reverser door and a fourth link connecting the second crank to the second reverser door.

10. The thrust reverser of claim 9, further comprising an actuator having a first end connected to the frame and a second end connected to the first reverser door.

11. The thrust reverser of claim 10, wherein the frame further comprises a bulkhead and wherein the first end of the actuator is connected to the bulkhead.

12. A pivot door thrust reverser, comprising:
a frame having a central axis, a first side beam and a second side beam, the second side beam positioned on an opposite side of the central axis from the first side beam;
a first reverser door pivotally mounted to the first side beam and to the second side beam;
a second reverser door directly and pivotally mounted to the first reverser door;
a first crank pivotally mounted to the first side beam at a first crank pivot point, the first crank having a first crank outer radial portion and a first crank inner radial portion with respect to a radial dimension extending from the first crank pivot point;
a first link directly connecting the first crank inner radial portion of the first crank to the first reverser door; and
a second link directly connecting the first crank outer radial portion of the first crank to the second reverser door.

13. The thrust reverser of claim 12, wherein the first side beam includes a first side beam aft end, wherein the second side beam includes a second side beam aft end and wherein the first reverser door is pivotally mounted to the frame proximate the first side beam aft end of the first side beam and proximate the second side beam aft end of the second side beam.

14. The thrust reverser of claim 13, wherein the first reverser door includes a first side and a second side, wherein the second reverser door includes a first side and a second side and wherein the first side of the second reverser door is pivotally mounted to the first side of the first reverser door and wherein the second side of the second reverser door is pivotally mounted to the second side of the first reverser door.

15. The thrust reverser of claim 12, further comprising a second crank pivotally mounted to the second side beam at a second crank pivot point, a third link connecting the second crank to the first reverser door and a fourth link connecting the second crank to the second reverser door, wherein the second crank includes a second crank inner radial portion with respect to the second crank pivot point and a second crank outer radial portion with respect to the second crank pivot point and wherein the third link has a first end pivotally connected to the second crank inner radial portion and a second end pivotally connected to the first reverser door and the fourth link has a first end pivotally connected to the second crank outer radial portion and a second end pivotally connected to the second reverser door.

16. A pivot door thrust reverser, comprising:
- a frame having a central axis, a forward bulkhead, a first side beam extending aft of the forward bulkhead and a second side beam extending aft of the forward bulkhead, the second side beam positioned on an opposite side of the central axis from the first side beam;
- a first reverser door pivotally mounted to the first side beam and to the second side beam;
- a second reverser door directly and pivotally mounted to the first reverser door;
- a first crank pivotally mounted to the first side beam at a first crank pivot point, the first crank having an outer radial portion and an inner radial portion with respect to a radial dimension extending from the first crank pivot point;
- a second crank pivotally mounted to the second side beam;
- a first link directly connecting the inner radial portion of the first crank to the first reverser door;
- a second link directly connecting the outer radial portion of the first crank to the second reverser door;
- a third link directly connecting the second crank to the first reverser door;
- a fourth link directly connecting the second crank to the second reverser door; and
- an actuator having a first end connected to the frame and a second end connected to the first reverser door.

* * * * *